Sept. 28, 1954  J. BOHLI  2,690,527
MAGNETIC CHUCK PLATE
Filed July 20, 1949
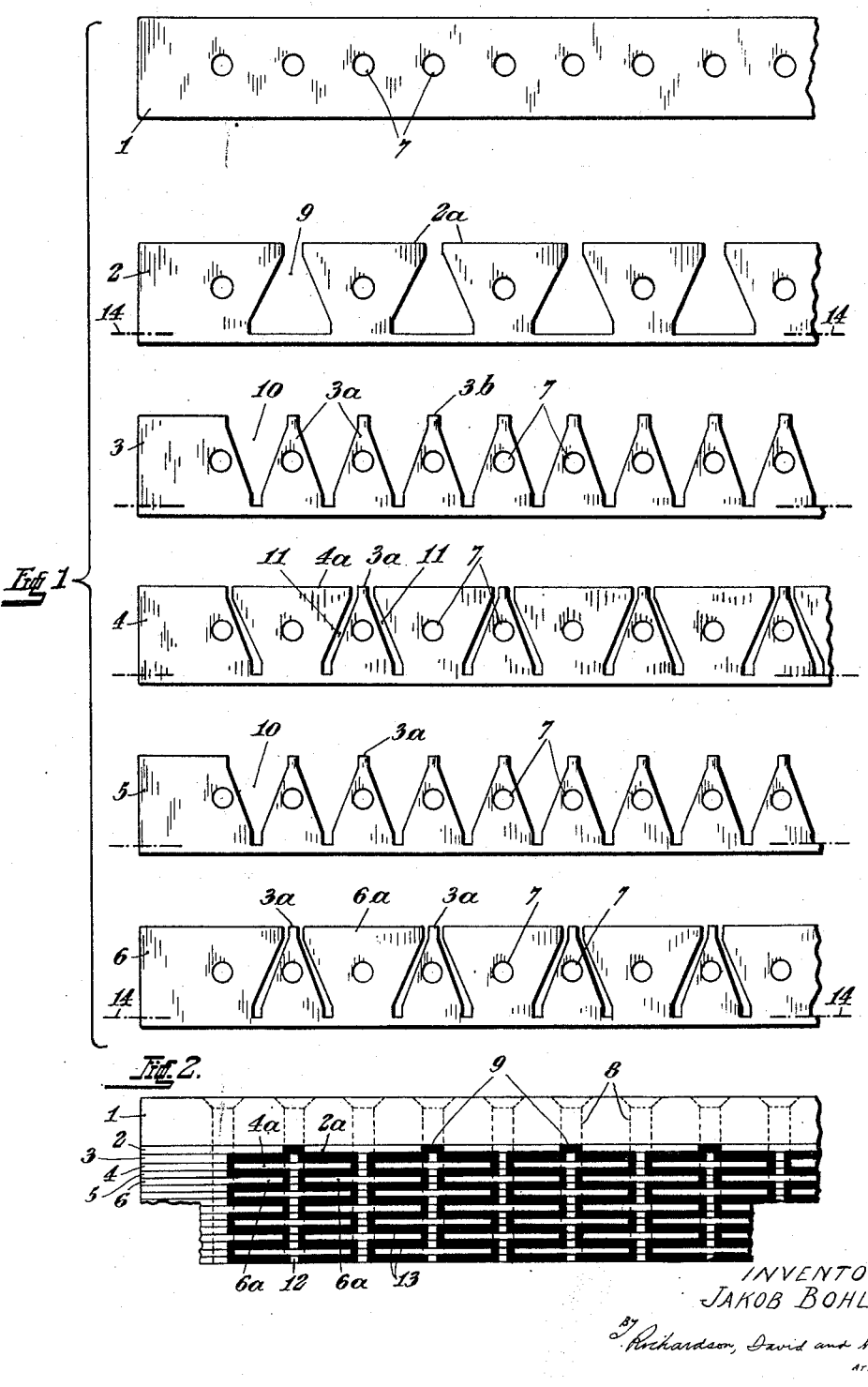
INVENTOR:
JAKOB BOHLI Patented Sept. 28, 1954

2,690,527

UNITED STATES PATENT OFFICE 2,690,527

MAGNETIC CHUCK PLATE

Jakob Bohli, Solothurn, Switzerland

Application July 20, 1949, Serial No. 105,779

Claims priority, application Switzerland
July 23, 1948

4 Claims. (Cl. 317—162)

1

The present invention relates to a magnetic chuck plate which is arranged to be magnetized by engagement with a magnet, the magnet being provided with a series of generally coplanar spaced pole faces of alternate magnetic polarities.

The chuck plate is arranged to provide pole faces of substantially uniform and equal widths for engagement with the magnet pole faces, and to provide work holding pole faces of alternate magnetic polarities with an elongated serpentine non-magnetic gap separating adjacent pole faces at the work holding side of the chuck.

Generally the invention provides a magnetic chuck plate having two sides, one of which comprises a series of pole faces of alternate magnetic polarities arranged with a uniform rectilinear gap between adjacent pole faces in order to provide a configuration suitable for engagement with maximum magnetic efficiency with the usual rectangular pole faces of the magnets which magnetize the chuck plate. At the other side of the chuck plate which is arranged for holding a magnetizable workpiece, adjacent pole faces are separated by an elongated serpentine gap which assures the passage of sufficient flux for holding a workpiece of small size or irregular shape.

A feature of the invention resides in the fact that the chuck plate is formed of laminations or strips of magnetic material which are stacked together in sets having apertures of different configurations formed in the several strips which make up a set. The apertures may conveniently be formed in a punch press. At the magnet engaging side of each strip a continuous edge portion is initially provided which is milled or otherwise cut away after assembly. After the edge portion has been removed there remains a series of pole faces which are spaced apart and separated by uniform rectilinear non-magnetic gaps. All non-magnetic gaps throughout the chuck plate are filled with a suitable non-magnetic filling to prevent fouling of the chuck plate by the accumulation of chips of magnetizable material in the gaps.

Various objects and other features and advantages of the invention will become apparent upon reading the following specification together with the accompanying drawing forming a part hereof.

Referring to the drawing:

Figure 1 is an exploded side view showing the several component strips or lamellae which make up a set of laminations prior to assembly and prior to removal of the continuous lower edge portion of the strips.

Figure 2 is a fragmentary plan view of the workpiece holding side of the chuck plate after assembly.

For simplicity of illustration the only embodiment of the invention which is shown is a type of chuck plate which is suitable for use with magnetizing means which comprises coplanar spaced parallel rectangular pole pieces of alternate magnetic polarities. The magnetizing means may be of the permanent magnet or electromagnetic type, as desired, and no specific form of magnetizing means is shown.

The chuck plate or pole-plate consists of two longitudinal side bars 1 (in the drawing only one bar is shown), two lamellar-unit-series 2, 2a arranged one at the inner side of each of said bars, and of several sets each, of four different strips or lamellar-unit-series 3, 4, 5, 6.

Each series is made of suitable magnetizable steel strip, for instance by punching. Each strip shows a number of holes 7 for putting through rivets 8, which hold together the longitudinal bars 1, and all the lamellar-units of a row, parallel to the pole pieces or pole-bars. The lamellae 2 have notches 9 widening in a downward direction and open at the upper edge. These notches 9 separate lamellar-units of laterally extending pole piece wing portions pole-bar-side-flaps 2a, which widen in an upward direction and are triangular shaped. The lamellae 3 and 5 are identical, the notches 10 thereof are also identical with the pole-bar-intermediate-units 3a, which are triangular shaped with blunt, two-cornered tongues 3b.

To save a maximum of material the two lamellae 3 and 5 are punched simultaneously out of a single metal strip without loss of material, in such a way that the solid parts of one lamella correspond to the notches of the other lamella.

The lamellae 4 and 6 are also identical, except at their end portions. They are a combination of the lamellae 2 and 3, in such a way that identical solid parts of the lamellae 3 and 5 are arranged between the lamellar-units of pole-bar-side-flaps 2a leaving a gap-shaped clearance 11 in the triangular shaped notches 9.

For making the pole-plate, several lamellar-sets of the kind described and indicated in the drawing are arranged side by side according to the succession of the numbers 3, 4, 5 and 6, between two longitudinal side bars 1, respectively, between the two end-lamellae 2, and are riveted together with these units. To limit each second pole-bar-end, the notches 9, which are arranged staggered to another by one pole-bar-division, of the lamellae 2 are filled in with non-magnetic, close-fitting metal pieces, and all clearances or air gaps in and between the lamellar-units are filled in with a suitable non-magnetic filling material, for instance with synthetic resin or metal, and the continuous lower edge of the assembled strip or lamellae below the broken lines 14 is removed, for instance by milling. No removed or ground metal particles can fall into the clearances and foul the chuck plate, as these clearances between the whole lamellar-units have been filled in.

The chuck plate or pole-plate made in this way has pole pieces or pole-bars 12 (Fig. 2) which extend transversely across the plate, adjacent pole pieces being of opposite magnetic polarities. Each of the pole pieces is shaped at the lower surface of the plate to provide a series of transversely extending surfaces arranged for magnetically efficient engagement with the usual rectangular pole faces of the magnetizing means. As may be seen from Fig. 1, after removal of the continuous edge portion below the line 14, the several assembled strips will form lower surfaces of substantially uniform and equal widths spaced apart to define a series of substantially rectilinear non-magnetic gaps between adjacent surfaces. At the upper, or workpiece engaging side of the chuck plate, the laterally extending wing portions of adjacent pole pieces formed by pole piece components 4a and 6a of strips 4 and 6 are interleaved and spaced apart (Fig. 2) to define a non-magnetic gap 13 of serpentine configuration the width of the serpentine gap 13 being generally equal to the width of the rectilinear gap at the bottom of the chuck plate and the length of the serpentine gap 13 being considerably longer than the length of the rectilinear gap. As shown in Fig. 2, the width of the serpentine gap 13 is substantially equal to the thickness of the wing portions of members 4a and 6a.

In Fig. 2 the lamellae, and also accordingly the pole-limiting-gaps, are—for the sake of distinctness—drawn thicker (wider) than they are in reality. The lamellae have practically a thickness of 0.5 mm. up to 1.5 mm. The pole-limiting-gaps have many times the length of the pole-bars and are closely compressed in the pole-bar-intermediate-zone so that in practice for the ingress and egress of magnetic force lines, there exist relatively many, and lying very closely to each other, magnetic paths, evenly distributed over all the pole-bar-intermediate-zones.

The bottom part of the pole-plate, i. e. that side of the pole-plate which is opposite to the work-holding side, has only narrow intervals between the lamellar-units which constitute the pole-bars. It follows thereby that the pole-bars are broad at the bottom, and therefore relatively great metal surfaces of the pole-plate are available for the transmission of the magnetic flux from the magnet pole-bars to the pole-plate pole-bars and in the other direction, from these to the magnet pole-bars.

On the upper side, i. e. on the work-holding side, the magnetic lines are distributed, respectively, compressed in many small metal surfaces separated by intervals from each other. It is obvious therefore that many very small and thin work of magnetizable material can be kept in position on the described pole-plate during working with a considerably greater force than at formerly known pole-plates.

To make the pole-plate non-magnetic, the pole-plate and the magnet-plate have to be shifted relative to each other by half of the pole-bar distance. Then the work can be taken off the pole-plate without magnetic resistance. Of course, the pole-plate of the work holding device of the present invention can equally be used for bigger work.

Instead of one lamellae only, there may also be used two each, or more, identical lamellae side by side, in order to change thereby the proportion of iron-air at the work-holding side to that of the opposite side, i. e. the magnet-plate side, In consequence of this immediate arrangement of more or less identically shaped lamellae side by side, the possibility exists of the specific attractive power of an effective surface-unit of the pole-plate being adapted according to well-defined purposes, in such a way that, for instance, the attractive power of the work-holding device for bigger work is improved at the expense of the attractive power for thin and very thin work. It is possible to choose the best suited pole-plate by stocking magnetic work-holding devices of various attractive powers for work of certain thickness.

Instead of making the pole-plates of punched lamellae, the pole-plate can be milled of whole steel bars, with laterally extending lamellar-wings, or they can also be made by casting.

What I claim and wish to secure by Letters Patent is:

1. A magnetic chuck plate of the class described, comprising: a series of spaced transverse pole pieces extending across said plate, adjacent pole pieces being of opposite magnetic polarities, each of said pole pieces being shaped at one surface of said plate to define a series of transversely extending surfaces of substantially uniform and equal widths, said surfaces at said one surface of said plate being adapted for engagement with magnetizing means, adjacent surfaces being spaced apart to define a substantially rectilinear non-magnetic gap therebetween, said pole pieces being shaped at the opposite surface of said plate to form a series of narrow transversely extending coplanar surfaces with spaced laterally extending wing portions, said surfaces at said opposite surface of said plate being adapted for engagement with a magnetizable workpiece to be held by said chuck, said wing portions of adjacent pole pieces being interleaved and said pole pieces being spaced apart to define a non-magnetic gap of serpentine configuration between adjacent surfaces of said pole pieces at said opposite surface of said plate, the width of said serpentine gap being generally equal to the width of said rectilinear gap and the length of said serpentine gap being appreciably longer than the length of said rectilinear gap.

2. A chuck plate according to claim 1, in which at least one of said gaps consists of solid non-magnetic material interposed between adjacent pole pieces, said non-magnetic material being coplanar with said coplanar surfaces at said workpiece engaging surface of said chuck plate.

3. A chuck plate according to claim 1, in which said wing portions are of substantially equal thicknesses and wherein said gap of serpentine configuration comprises rectangular bends and is of a constant width substantially equal to the thickness of said wing portions.

4. A chuck plate according to claim 3, in which each pole piece consists of two different kinds of lamellar parts, whereof the parts belonging to one of said kinds form the laterally extending wing portions and have an outline which widens from the magnetizing means engaging surface to the workpiece engaging surface, while the parts belonging to the other kind have an outline which narrows from the magnetizing means engaging surface to the workpiece engaging surface, and in which between two adjacent lamellar parts forming wing portions of each pole piece are located three lamellar parts of the other kind.

References Cited in the file of this patent

UNITED STATES PATENTS

| Number | Name | Date |
|---|---|---|
| 1,254,664 | Downs et al. | Jan. 29, 1918 |
| 1,343,751 | Simmons | June 15, 1920 |
| 1,507,777 | Karasick | Sept. 9, 1924 |
| 1,754,466 | Hosking | Apr. 15, 1930 |
| 1,970,922 | Simmons | Aug. 21, 1934 |
| 2,132,885 | Tracy | Oct. 11, 1938 |
| 2,138,864 | Karasick | Dec. 6, 1938 |
| 2,342,552 | Mallina | Feb. 22, 1944 |
| 2,455,864 | Hanna | Dec. 7, 1948 |
| 2,488,961 | Camilli | Nov. 22, 1949 |

OTHER REFERENCES

Publication: Simmons Unit-Pole Magnetic Chucks. The Taft Pierce Mfg. Co., Bulletin 107, June 1919, pp. 11–13.